United States Patent [19]

Hayashi et al.

[11] Patent Number: 4,896,941

[45] Date of Patent: Jan. 30, 1990

[54] IMAGE-TRANSMITTING FIBER

[75] Inventors: Shotaro Hayashi; Tsugio Sonobe; Kiyonori Ishii, all of Ibaraki; Kazuo Sanada; Sadao Chigira, both of Chiba; Takashi Tsumanuma; Osamu Fukuda, both of Sakura, all of Japan

[73] Assignees: Doryokuro Kakunenryo Kaihatsu Jigyodan; Fujikura Ltd., both of Tokyo, Japan

[21] Appl. No.: 325,033

[22] Filed: Mar. 2, 1989

Related U.S. Application Data

[63] Continuation of Ser. No. 201,385, May 31, 1988, abandoned, which is a continuation of Ser. No. 852,583, Apr. 16, 1986, abandoned.

[30] Foreign Application Priority Data

Apr. 27, 1985 [JP] Japan .................................. 60-93269

[51] Int. Cl.$^4$ .............................................. G02B 5/17
[52] U.S. Cl. ...................................... 350/96.25; 128/6
[58] Field of Search ............... 350/96.10, 96.23, 96.24, 350/96.26

[56] References Cited

U.S. PATENT DOCUMENTS

| | | | |
|---|---|---|---|
| 3,554,721 | 1/1971 | Gardner | 350/96.24 X |
| 3,941,121 | 3/1976 | Olinger et al. | 350/96.26 X |
| 4,235,615 | 11/1980 | Rau et al. | 350/96.34 |
| 4,389,089 | 6/1983 | Strack | 350/96.26 |
| 4,504,114 | 3/1985 | Arrington | 350/96.34 |
| 4,613,205 | 9/1986 | Seiji et al. | 350/96.25 |
| 4,615,583 | 10/1986 | Tsuno et al. | 350/96.25 |

FOREIGN PATENT DOCUMENTS 5994042 11/1982 Japan .

Primary Examiner—William L. Sikes
Assistant Examiner—Akm E. Ullah
Attorney, Agent, or Firm—Sprung Horn Kramer & Woods

[57] ABSTRACT

An image-transmitting fiber includes at least one first fiber element for transmitting light power therethrough, and a plurality of second fiber elements disposed around and extending along the first fiber element. The second fiber elements cooperates with one another for transmitting an image of an object therethrough. The first fiber element is greater in diameter than each of the second fiber elements.

13 Claims, 2 Drawing Sheets

IMAGE-TRANSMITTING FIBER

This is a continuation of Ser. No. 201,385, filed 5/31/88, now abandoned, which is a continuation of Ser. No. 852,583, filed 4/16/86, now abandoned.

BACKGROUND OF THE INVENTION

1. Field of the Invention

This invention relates to an image-transmitting optical fiber for use in a remote-control system of emission spectroscopic analysis, fluorescence spectroscopic analysis and absorption spectroscopic analysis.

2. Prior Art

FIG. 1 schematically shows an emission spectroscopic analysis system. A plasma generator 10 comprises positive electrodes 12 and a negative electrode 13, and a sample 14 is introduced into a plasma flame 16 produced by the positive and negative electrodes 12 and 13, so that the sample 14 is heated and excited to cause emission, the emission portion being designated by numeral 18 as best shown in FIG. 2. An image-transmitting fiber 20 extends into a housing 22 of the plasma generator 10 and has a condenser 24 secured to one end thereof in the housing 22, the image-transmitting fiber 20 comprising a plurality of fiber elements. The one end of the image-transmitting fiber 20 is fixed relative to a device 26 for the fine adjustment of the optical axis of the fiber 20. The image-transmitting fiber 20 extends through a spiral hole 28a in a block 28 mounted in a wall 30 of concrete. First, an ocular lens 32 is attached to the other end of the image-transmitting fiber 20 remote from the condenser 24, and the condenser 24 is brought into alignment with the emission portion 18 by the optical axis adjustment device 26. Then, the ocular lens 32 is removed from the other end of the image-transmitting fiber 20, and the other end is connected to a housing 34 of a spectroscopic analysis device 36 so that the image of the emission portion 18 is transmitted thereinto through the image-transmitting fiber 20 and a slit 34a of the housing 34. As best shown in FIG. 2, the emission portion 18 is enclosed by the plasma 12 of an inverted Y-shape.

The image-transmitting fiber 20 serves as an image sensor for viewing the emission portion 18 and transmitting its image. Also, the image-transmitting fiber 20 serves to transmit the power of the light of the emission portion 18. Since the image-transmitting fiber 20 performs the function of the image sensor, it must have a high resolution. To achieve this, it is desired to increase the number of the fiber elements of the image-transmitting fiber 20 which elements serve to transmit the image of the emission portion 18. However, it is undesirable that the image-transmitting fiber 20 becomes too large in diameter, because the flexibility of the fiber 20 is affected. Therefore, when it is desired to increase the number of the fiber elements while limiting the diameter of the image-transmitting fiber 20, each of the fiber elements has to be small in diameter, each fiber element being composed of a core and a cladding around the core. As a result, the amount of the energy leaking into the cladding becomes larger. Generally, the core of each fiber element of an image-transmitting fiber is made of pure silica while the cladding is made of fluorine-doped silica. The wavelength measured in spectroscopic analysis is between ultraviolet and visible light range. The cladding of fluorine-doped silica exhibits a greater loss, that is, poor initial characteristics, particularly at a short wavelength range of 0.24 to 0.35 μm. Therefore, when the energy leaks into the cladding, a transmission loss of light power becomes considerably high. In addition, the cladding of fluorine-doped silica possesses extremely poor radiation-resistance characteristics in comparison with pure silica. Therefore, when the image-transmitting fiber of the type described is used in an environment in which it is subjected to radioactivity, the transmission loss further becomes greater.

The amount of leaking of the energy into the cladding depends largely on the diameter of the core of the fiber element. More specifically, the greater the core diameter becomes, the amount of leaking of the energy becomes less to thereby enhance the characteristics of the fiber element. Therefore, a simple solution is to increase the diameter of the core of the fiber element. This approach is disadvantageous, however, in that the diameter of the fiber element becomes greater, so that the overall diameter of the image-transmitting fiber becomes greater. The image-transmitting fiber of such a diameter is less flexible, and hence can not be bent with a smaller radius, and can not be handled easily.

In order to keep the transmission loss due to the cladding of the fiber element to an acceptable level, it is necessary that the core of the fiber element should have a diameter of about 50 μm. However, it is impractical to provide the image-transmitting fiber composed of fiber elements having such a core diameter.

As described above, the image-transmitting function and light power-transmitting function of the fiber element are incompatible, and if it is desired to improve one of them, then the other becomes worse.

SUMMARY OF THE INVENTION

It is therefore an object of this invention to provide an image-transmitting fiber of the type in which light power can be efficiently transmitted without affecting the image-transmitting ability.

According to the present invention, there is provided an image-transmitting fiber for transmitting an image of an object from one end thereof to the other end which comprises at least one first fiber element for transmitting light power therethrough, and a plurality of second fiber elements disposed around and extending along said first fiber element, said second fiber elements cooperating with one another for transmitting the image of the object therethrough, and said first fiber element being greater in diameter than each of said second fiber elements.

DESCRIPTION OF THE PREFERRED EMBODIMENT OF THE INVENTION

Figure 1:
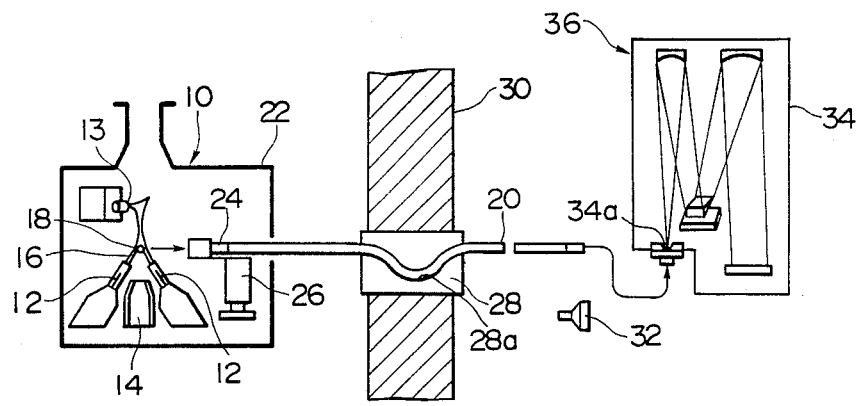
FIG. 1 is a schematic view of an emission spectroscopic analysis system.
Figure 2:
FIG. 2 is an enlarged view of an emission portion in a plasma generator of the system.

An image-transmitting fiber 50 comprises a fiber element 52 serving as a light power-transmitting portion, a plurality of fiber elements 54 serving as an image-transmitting portion 54a and disposed around and extending along the light power-transmitting fiber element 52, a jacket 56 of quartz formed around the image-transmitting portion 54a, and a coating 58 of a synthetic resin formed around the jacket 56, the light power-transmitting fiber element 52 being disposed at the center of the image-transmitting fiber 50. The light power-transmitting fiber element 52 is much greater in diameter than each of the image-transmitting fiber elements 54.

The light power-transmitting fiber element 52 is composed of a core 52a made of pure silica and a cladding 52b formed around the core 52a. The cladding 52b is made of fluorine-dope silica, boron-doped silica, or fluorine and boron-doped silica. The core 52a has a diameter of 600 μm while the cladding has a diameter of 800 μm. Numerical Aperture (N. A.) is 0.21.

The number of the fiber elements 54 of the image-transmitting portion 54a is 6,000. Each of these fiber elements 54 is also composed of a core and a cladding formed around the core, the core being made of pure silica and having a diameter of 10 μm. The jacket 56 has an outer diameter of 2.0 mm.

The core 52a of the light power-transmitting fiber element 52 has a diameter of not less than 50 μm in order to keep the leakage of the energy into the cladding 52b, that is, the transmission loss, to an acceptable level.

The process of preparing the image-transmitting fiber 50 will now be described.

A mother rod, having an outer diameter of 15 mm and composed of a core portion of pure silica and a cladding portion of fluorine-doped silica around the core portion, was elongated into a diameter of 10 mm at temperatures of about 2,200° C. in a heater, to thereby provide a first intermediate optical fiber. The ratio of the core portion to the cladding portion was 1.2, refractive index difference being 1.2% (Δn=1.2%). This intermediate optical fiber was prepared for providing the light power-transmitting fiber element 52.

Also, another mother rod, having an outer diameter of 15 mm and composed of a core portion of pure silica and a cladding portion of fluorine-doped silica around the core portion, was drawn into a diameter of 300 μm to form a second intermediate optical fiber, the ratio of the core portion to the cladding portion being 1.4 (Δn=1.1%). The second intermediate optical fiber was prepared for providing the image-transmitting fiber elements 54.

A pipe of quartz having an inner diameter of 21 mm and an outer diameter of 24 mm was prepared for providing the jacket 56. Then, the first intermediate optical fiber of a greater diameter was inserted into the quartz pipe and fixed with respect thereto so as to be disposed coaxially with the quartz pipe, using a jig. Then, a number of second intermediate optical fibers of a smaller diameter were filled in an annular space formed between the outer peripheral surface of the first intermediate optical fiber and the inner peripheral surface of the quartz pipe to form a optical fiber preform, the second intermediate optical fibers extending along the axes of the first intermediate optical fiber and the quartz pipe. Then, the preform was fed at a speed of 30 mm/min. to a drawing die in a heater and was drawn at elevated temperatures at 4 m/min to form an image-transmitting fiber 50. Thus, the first and second intermediate optical fibers were converted respectively to the light power-transmitting fiber element 52 and the image-transmitting fiber elements 54. Also, the quartz pipe was converted to the jacket 56. Ultraviolet (UV) curable resin was applied onto the jacket or pipe 56 by an in-line coating method to form the coating 58 to provide the image-transmitting fiber 50. The diameter of the image-transmitting fiber 50 before the coating 58 was applied thereto was 1.9 mm, and the diameter of the image-transmitting fiber 50 with the coating 58 was 2.4 mm.

The operation of the image-transmitting fiber 50 will now be described. In a remote-control system of emission spectroscopic analysis similar to that shown in FIG. 1, an image of a sample to be analyzed is transmitted via the image-transmitting fiber elements 54 of the image-transmitting fiber 50. In other words, the sample is viewed through the image-transmitting fiber elements 54, the view obtained through the image-transmitting fiber 50 being shown in FIG. 4 in which numeral 16 designates a plasma and numeral 18 an emission portion. The image-transmitting fiber elements 54 serving as an image sensor is similar in construction to that of the conventional one, and therefore they are similar in sensitivity. The light-power transmitting fiber element 52, serving to transmit the power of the light of the emission portion 18, is of such a large diameter that the energy hardly leaks into the cladding, thereby keeping the transmission loss to a minimum. Since the cores of the fiber elements 52 and 54 are made of pure silica which has good radiation-resistance characteristics, the image-transmitting fiber 50 can be suitably used for a remote-control emission spectroscopic analysis of a radioactive substance.

EXAMPLE 1

Figures 3, 4:
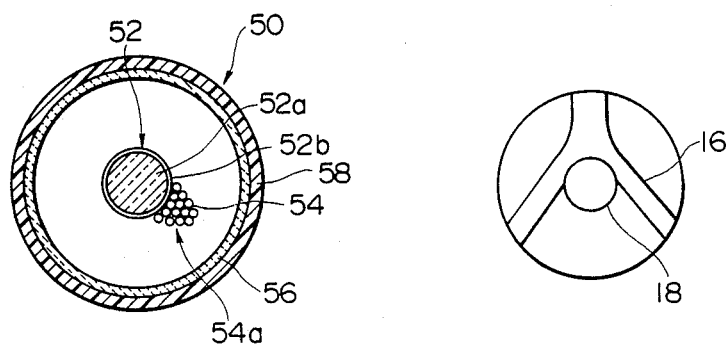
FIG. 3 is a cross-sectional view of an image-transmitting fiber provided in accordance with the present invention.
FIG. 4 is a view of a plasma viewed through the image-transmitting fiber.
Figure 5:
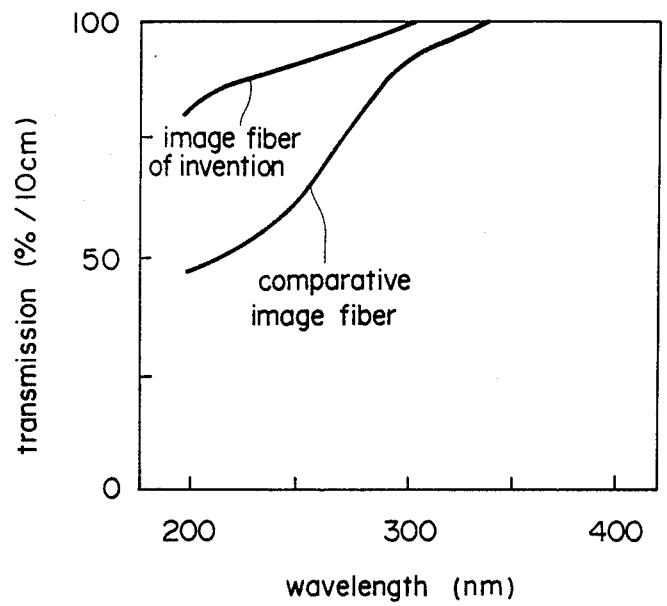
FIG. 5 is a diagrammatical illustration showing the relation between transmission and wavelength.

An image-transmitting fiber according to the present invention, which was of the same construction as the image-transmitting fiber 50 of FIG. 3, was prepared according to the procedure described above. For comparison purposes, there was prepared a comparative image-transmitting fiber of the conventional type which differed from the image-transmitting fiber 50 of FIG. 3 in that the light power-transmitting fiber element 52 of a greater diameter was omitted and that the image-transmitting fiber elements 54 were fully filled in the jacket 56. The image-transmitting fiber of the present invention and the comparative image-transmitting fiber were tested for determining the transmission thereof. The results obtained are shown in FIG. 5. As can be seen from FIG. 5, the image-transmitting fiber of the present invention exhibited a better transmission than the conventional image-transmitting fiber.

Figure 6:
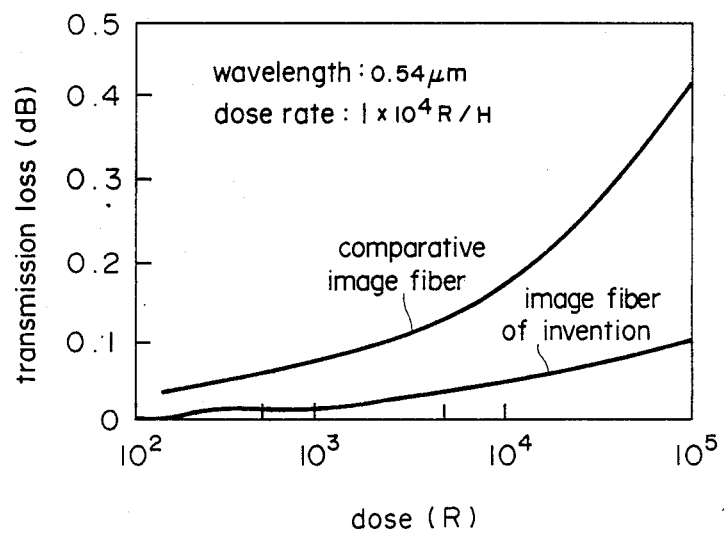
FIG. 6 is a diagrammatical illustration showing the relation between transmission loss and dose.

The image-transmitting fiber of the present invention and the comparative image-transmitting fiber were also tested for determining a transmission loss in a radioactive environment. The results obtained are shown in FIG. 6. As can be seen from FIG. 6, the image-transmitting fiber of the present invention was subjected to less transmission loss than the comparative image-trasmitting fiber.

And, the above transmission and the above loss in the radioactive environment of the image-transmitting fiber of the present invention were almost as good as those of a single optical fiber having almost the same diameter as the image-transmitting fiber of the present invention.

EXAMPLE 2

An emission spectroscopic analysis of a sample was carried out, using a system similar to that shown in FIG. 1, using an image-transmitting fiber according to the present invention and a comparative image-transmitting fiber both of which were prepared according to the above procedures in EXAMPLE 1. The results of the analysis are shown in TABLE below.

TABLE

| Elements in sample | Measuring wavelength (μm) | Detection sensitivity (ppm) *Inv. | Detection sensitivity (ppm) *Com. | **Detection sensitivity after dose of $10^3$ R (ppm) *Inv. | **Detection sensitivity after dose of $10^3$ R (ppm) *Com. |
|---|---|---|---|---|---|
| B | 0.24 | 0.5 | 2 | 1.5 | unable to detect |
| Si | 0.28 | 0.1 | 0.5 | 1.2 | " |
| Fe | 0.3 | 0.2 | 1 | 0.5 | 2 |
| Ni | 0.34 | 0.2 | 1 | 0.4 | 2 |

"*Inv." indicates the image-transmitting fiber according to the present invention while "*Com." indicates the comparative image-transmitting fiber. "**" means the detection sensitivity after each image-transmitting fiber was subjected to a dose of $10^3$ R.

As can be seen from TABLE, the detection sensitivities of the image-transmitting fiber according to the present invention was much better than those of the comparative image-transmitting fiber.

As described above, the image-transmitting fiber according to the present invention can serve the purposes of transmitting the image and transmitting the light power satisfactorily.

While the image-transmitting fiber has been specifically shown and described herein, the invention itself is not to be restricted by the exact showing of the drawings or the description thereof. For example, although in the illustrated embodiment, the image-transmitting fiber 50 has only one light power-transmitting fiber element 52 of a greater diameter, it may have more than one. Also, the light power-transmitting fiber element 52 is of a circular cross-section, it may have any other cross-sectional shape such as a polygonal shape and an oval shape. Further, although the light power-transmitting fiber element 52 is disposed at the center of the image-transmitting fiber 50, it may be eccentric from the longitudinal axis of the image-transmitting fiber 50.

What is claimed is:

1. In image-transmitting fiber for transmitting an image of an object from one end of the fiber to the other end, the fiber comprising at least one first fiber element for transmitting light power therethrough, and a plurality of second fiber elements disposed around and extending along said first fiber element, said second fiber elements cooperating with one another for transmitting the image of the object therethrough, and said first fiber element being greater in diameter than each of said second fiber elements.

2. An image-transmitting fiber according to claim 1, in which said first fiber element is composed of a core and a cladding formed around said core, and wherein said core of said first fiber element is not less than 50 μm.

3. An image-transmitting fiber according to claim 2, in which said core of said first fiber element is made of pure silica, and wherein said cladding of said first fiber element is made of one of fluorine-doped silica, boron-doped silica and fluorine-boron-doped silica.

4. An image-transmitting fiber according to claim 1, in which said first fiber element is disposed at the center of said image-transmitting fiber.

5. An image-transmitting fiber according to claim 1, further comprising a jacket of quartz formed around said second fiber elements, and a coating of a synthetic resin formed around said jacket.

6. An image-transmitting fiber according to claim 1, wherein at least at the ends of said image transmitting fiber, the axes of said second fiber elements are aligned with the axis of said first fiber element and the relative positions of said second fiber elements to each other are maintained to transfer an image of the area a round an object therethrough when the optical axis of said first fiber element is aligned with the object.

7. An image-transmitting fiber according to claim 2, wherein each of said second fiber elements is at most 10 μm in diameter.

8. An image-transmitting fiber according to claim 1, wherein said first fiber element and each of said second fiber elements have a ratio of at least five to one in diameter.

9. An image-transmitting fiber according to claim 1, wherein a great number of said second fiber elements, each second fiber element having practically an identical diameter, are fuse bonded one to the other at peripheries thereof and a cross-section of said image-transmitting fiber is uniform throughout the length thereof, whereby each of said second fiber elements transmitting a local optical image of an area around the object so as to make a total image of the area therefrom.

10. An image-transmitting fiber according to claim 9, wherein said first fiber element and said second fiber elements are so aligned that said first fiber element transmits the light emitted from the object when said second fiber elements transmit an image of an area at a center of the object which is located.

11. An image-transmitting fiber according to claim 10, wherein optical axes of said first fiber element and second fiber elements are parallel to a longitudinal axis of said image-transmitting fiber.

12. An image-transmitting fiber according to claim 11, wherein a first end of said image-transmitting fiber is so adopted that said first fiber element receives the light power emitted from the object and said second fiber elements receive the optical image of an area around the object, and a second end of said image-transmitting fiber is so adopted that said first fiber element is connectable to an analyzer and said second fiber elements is connectable to a view finder.

13. An emission spectroscopic analysis system comprises:
   (a) a plasma generator having three electrodes which are disposed at equal angular intervals about a center of the electrodes, and plasma generator generating a plasma flame at the center;
   (b) an analyzer for analyzing light power emitted from a specimen which is excited by the plasma flame; and
   (c) an image-transmitting fiber including one first fiber element disposed at a center thereof for transmitting light power emitted from the excited specimen from one end of said first fiber element to the other end, and a plurality of second fiber elements disposed around and extending along said first fiber element to the other end, and a plurality of second fiber elements disposed around and extending along said first fiber element, said second fiber elements cooperating with one another for transmitting the image of the plasma flame from one end of said second fiber elements to the other end, and said first fiber element being greater in diameter than each of said second fiber elements, an end of said image-transmitting fiber being so adopted that said first fiber element receives the light power emitted from the excited specimen when said second fiber elements receive the optical image of the periphery of the plasma flame and an area therearound, and the other end of said image-transmitting fiber being so adopted that said first fiber element is connectable to said analyzer and said second fiber elements is connectable to a view finder.

* * * * *

UNITED STATES PATENT AND TRADEMARK OFFICE
CERTIFICATE OF CORRECTION

PATENT NO. : 4,896,941
DATED : January 30, 1990
INVENTOR(S) : Hayashi et al.

It is certified that error appears in the above-identified patent and that said Letters Patent is hereby corrected as shown below:

Col. 5, claim 1 line 51     Delete " at least "

Col. 5, claim 1 line 51     After " element " insert -- disposed at the center of said image-transmitting fiber --

Col. 6, claim 13 line 55     Delete " and " and substitute -- said --

Signed and Sealed this

Fifteenth Day of February, 1994

Attest:

BRUCE LEHMAN

*Attesting Officer*     *Commissioner of Patents and Trademarks*